(12) United States Patent
Sadahiro et al.

(10) Patent No.: US 11,184,510 B2
(45) Date of Patent: Nov. 23, 2021

(54) ELECTRONIC CAMERA FILTER

(71) Applicant: Panavision International, L.P., Woodland Hills, CA (US)

(72) Inventors: Haluki Sadahiro, Oak Park, CA (US); Guy McVicker, Simi Valley, CA (US)

(73) Assignee: Panavision International, L.P., Woodland Hills, CA (US)

( * ) Notice: Subject to any disclaimer, the term of this patent is extended or adjusted under 35 U.S.C. 154(b) by 0 days.

(21) Appl. No.: 16/381,433

(22) Filed: Apr. 11, 2019

(65) Prior Publication Data

US 2019/0320099 A1 Oct. 17, 2019

Related U.S. Application Data

(60) Provisional application No. 62/657,574, filed on Apr. 13, 2018.

(51) Int. Cl.
| | | |
|---|---|---|
| *H04N 5/225* | (2006.01) | |
| *G02B 5/20* | (2006.01) | |
| *G09G 3/3208* | (2016.01) | |
| *G03B 11/00* | (2021.01) | |

(52) U.S. Cl.
CPC ............ *H04N 5/2254* (2013.01); *G02B 5/20* (2013.01); *G03B 11/00* (2013.01); *G09G 3/3208* (2013.01); *H04N 5/2256* (2013.01)

(58) Field of Classification Search
CPC .... H04N 5/2254; H04N 5/2256; H04N 5/238; G02B 5/0236; G02B 5/20; G02B 5/201; G02B 5/205; G02B 5/223; G02F 1/13725; G03B 11/00; G09G 3/3208
See application file for complete search history.

(56) References Cited

U.S. PATENT DOCUMENTS

| | | | |
|---|---|---|---|
| 2002/0071185 A1 | 6/2002 | Chretien et al. | |
| 2008/0007645 A1 | 1/2008 | McCutchen | |
| 2008/0123097 A1* | 5/2008 | Muhammed | G01J 3/0218 356/419 |
| 2014/0063049 A1 | 3/2014 | Armstrong-Muntner | |
| 2014/0104449 A1* | 4/2014 | Masarik | G02B 13/001 348/211.14 |
| 2015/0181098 A1* | 6/2015 | Davis | H04N 5/2256 348/342 |

(Continued)

FOREIGN PATENT DOCUMENTS

| | | |
|---|---|---|
| EP | 2648086 A2 | 10/2013 |
| JP | 2008072337 A | 3/2008 |

(Continued)

OTHER PUBLICATIONS

International Search Report dated Jul. 22, 2019 in corresponding International Application No. PCT/US 2019/027387 filed Apr. 12, 2019; total 4 pages.

(Continued)

*Primary Examiner* — Quan Pham
(74) *Attorney, Agent, or Firm* — Snell & Wilmer L.L.P.

(57) ABSTRACT

A filter for a camera lens including an electronic display configured to couple to an object side of the camera lens and configured to filter an image on an object side of the electronic display for the camera lens. A controller is configured to electrically control the filtering of the electronic display. An input is for receiving a control for controlling the controller.

42 Claims, 12 Drawing Sheets

(56) References Cited

U.S. PATENT DOCUMENTS

2017/0140558 A1* 5/2017 Lee .................. G06T 15/50
2017/0359495 A1* 12/2017 Hawes .............. H04N 5/2254
2019/0045144 A1* 2/2019 Reed ................. G01J 5/0806

FOREIGN PATENT DOCUMENTS

KR    20140144455 A  * 12/2014
KR    20140144455 A    12/2014

OTHER PUBLICATIONS

Written Opinion of the International Searching Authority dated Jul. 22, 2019 in corresponding International Application No. PCT/US 2019/027387 filed Apr. 12, 2019; total 8 pages.
Wikipedia contributors. "See-through display." Wikipedia, The Free Encyclopedia. Wikipedia, The Free Encyclopedia, Sep. 23, 2017. Web. Aug. 21, 2019. Retrieved from https://en.wikipedia.org/w/index.php?title=See-through_display&oldid=802069921; total 3 pages.

* cited by examiner

ELECTRONIC CAMERA FILTER

CROSS-REFERENCE TO RELATED APPLICATIONS

This patent application claims the benefit of U.S. Provisional Application No. 62/657,574 filed Apr. 13, 2018, which application is hereby incorporated by reference in its entirety.

BACKGROUND

Filters for cameras are used to reduce the amount of light coming into the camera or to produce other optical effects (e.g., varying the color of an image). These filters need to be interchanged manually to vary the optical effect produced by the filters. In movie productions, the manual interchange of filters cannot occur during the shot. In addition, the time and effort taken to swap out filters in between shots can increase the cost of movie production. For example, if a camera is located in a high crane, the crane will need to be lowered for the filter to be manually swapped out.

There is accordingly a need for a more efficient manner to vary filtering for cameras, without needing to manually swap out filters.

SUMMARY

The present disclosure addresses the above need by providing a filter having an electronic display. The filtering of the electronic display may be varied dynamically, and on a pixel-by-pixel basis depending on the particular type of electronic technology that is used.

In one embodiment, a filter for a camera lens is disclosed comprising an electronic display configured to couple to an object side of the camera lens and configured to filter an image on an object side of the electronic display for the camera lens. A controller is configured to electrically control the filtering of the electronic display. An input is for receiving a control for controlling the controller.

In one embodiment, a filter for a camera system is disclosed comprising an electronic display configured to couple to a portion of the camera system in an optical path of the camera system and configured to filter an image on an object side of the electronic display for the camera system. The electronic display includes one or more organic light emitting diodes. A controller is configured to electrically control the filtering of the electronic display. An input is for receiving a control for controlling the controller.

In one embodiment, a camera system is disclosed comprising a camera including a camera lens. An electronic display is configured to couple to an object side of the camera lens and configured to filter an image on an object side of the electronic display for the camera lens. A controller is configured to electrically control the filtering of the electronic display. An input is for receiving a control for controlling the controller.

In one embodiment, a filter for a camera system is disclosed including a camera including a camera lens. An electronic display is configured to couple to a portion of the camera system in an optical path of the camera system and configured to filter an image on an object side of the electronic display for the camera system, the electronic display including one or more organic light emitting diodes. A controller is configured to electrically control the filtering of the electronic display. An input is for receiving a control for controlling the controller.

In one embodiment, a method of filtering an image for a camera lens is disclosed comprising filtering, with an electronic display positioned on an object side of the camera lens, the image on the object side of the camera lens for the camera lens.

In one embodiment, a method of filtering an image for a camera system is disclosed comprising filtering, with an electronic display positioned in the optical path of the camera system, the image on the object side of the electronic display for the camera system, the electronic display including one or more organic light emitting diodes.

BRIEF DESCRIPTION OF THE DRAWINGS

Features and advantages of the systems, apparatuses, and methods as disclosed herein will become appreciated as the same become better understood with reference to the specification, claims, and appended drawings wherein:

DETAILED DESCRIPTION

Figure 1:
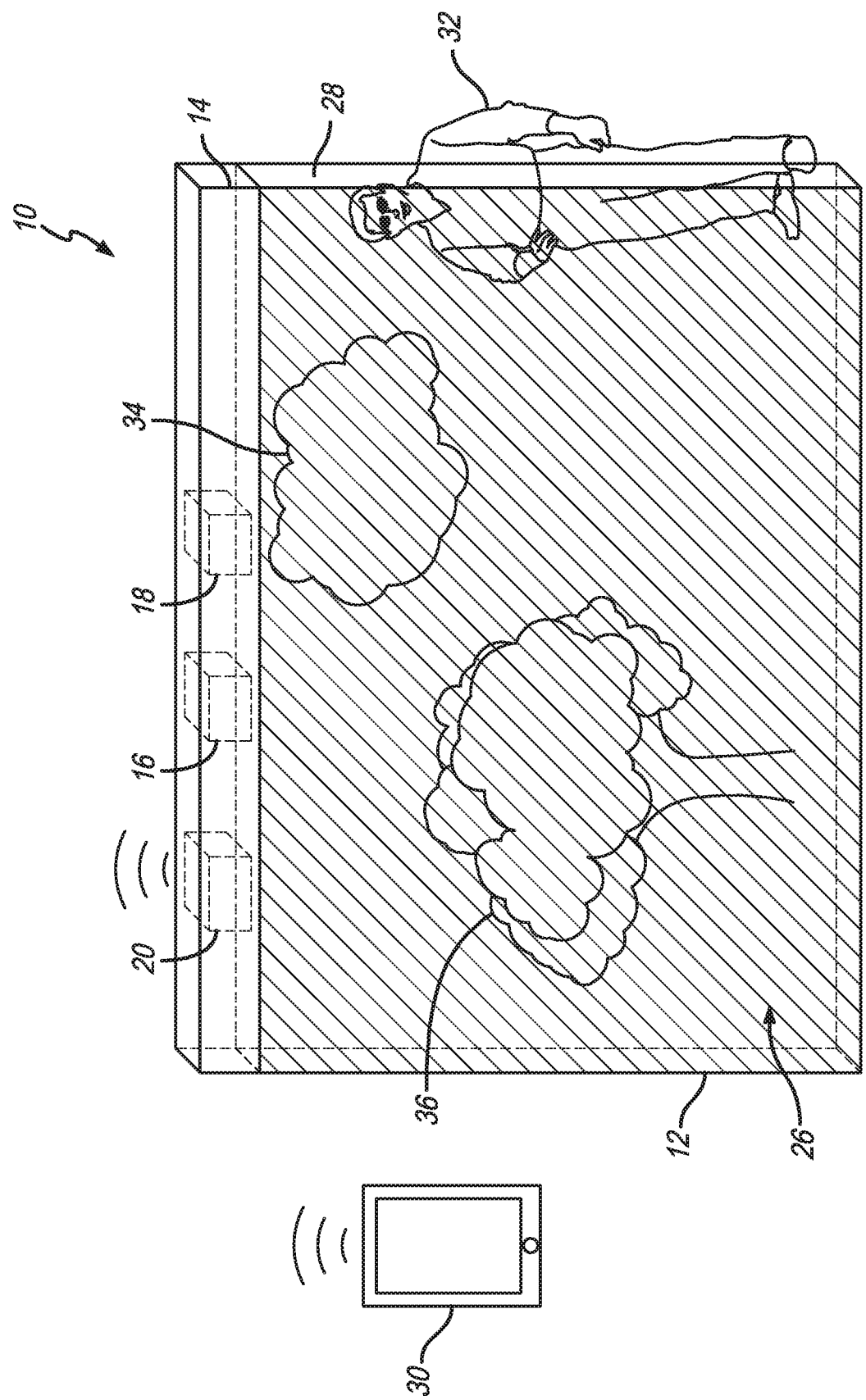
FIG. 1 illustrates a front view of a filter according to an embodiment of the present disclosure.

FIG. 1 illustrates a filter 10 according to an embodiment of the present disclosure. The filter 10 is preferably for use with a camera lens as part of a camera system. The filter 10 may include an electronic display 12 and may include a housing 14. The filter 10 may include a controller 16, a power source 18, and an input 20.

The electronic display 12 may be transparent (optically light transmissive) and may allow visible light to pass therethrough. The electronic display 12 may be configured such that filtering of the electronic display 12 is electronically controlled. The electronic display 12 may be configured to filter an image on an object side of the electronic display 12 for the camera lens. The filtering may occur through a variety of methods, and may include reducing the amount of light that is transmitted through the electronic display 12, or varying the color of the light that is passed through the electronic display 12, or otherwise varying the characteristics of the light passing therethrough. For example, the filtering may occur by filtering an image on the object side of the electronic display 12 by diffusing light transmitted through the electronic display 12, or flaring light transmitted through the electronic display 12 in a variety of directions, among other effects. The filtering may occur by emitting light from the electronic display 12 that is overlaid upon the image on the object side of the electronic display 12. The emitted light may vary the color or amount (intensity) of light that is received by the camera lens.

Figure 6B:
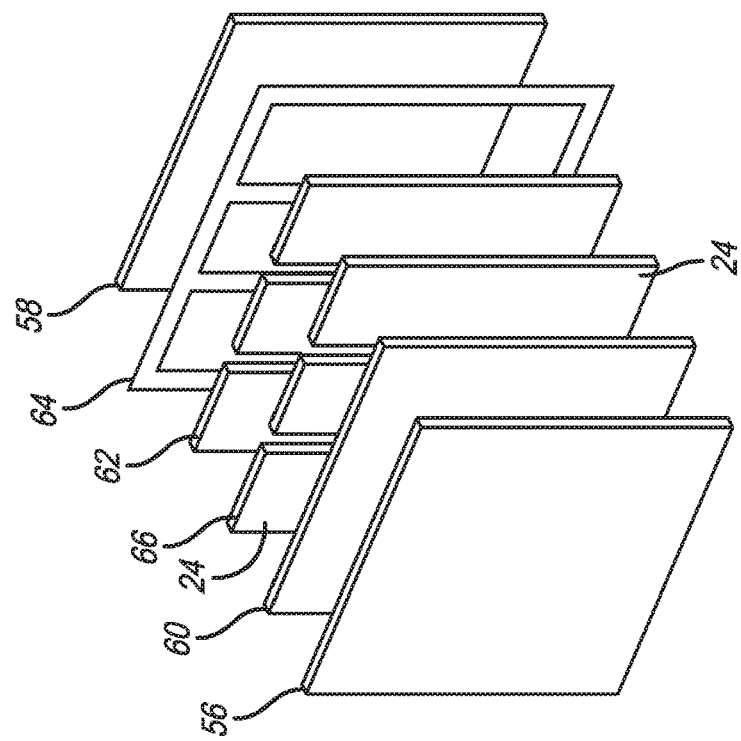
FIG. 6B illustrates a front perspective exploded view of a portion of an electronic display in which organic light-emitting diodes are utilized, according to an embodiment of the present disclosure.
Figure 6A:
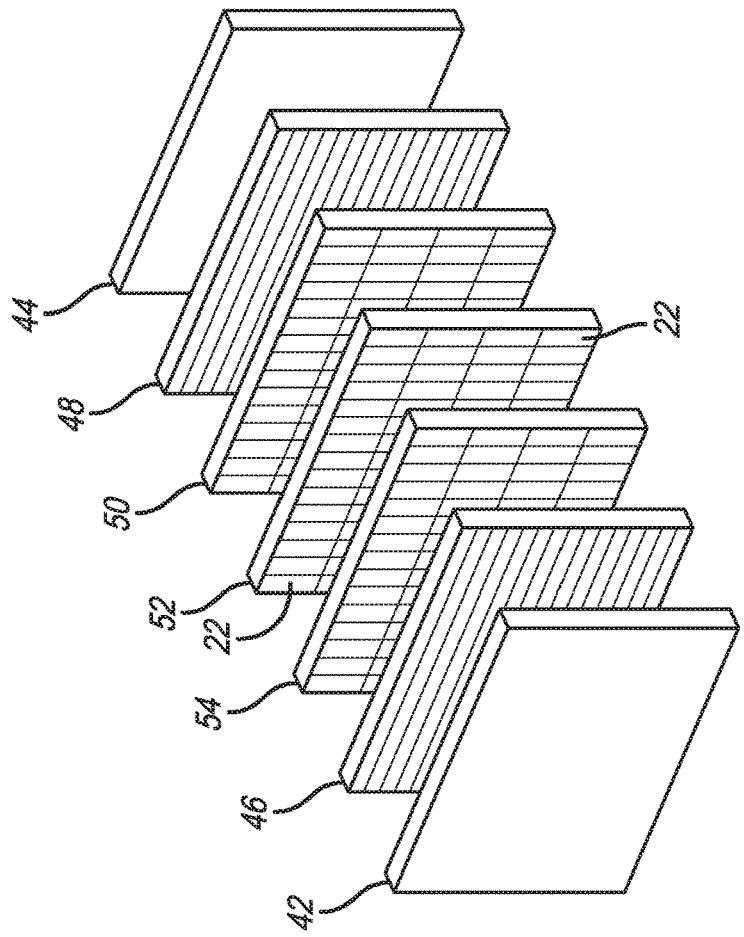
FIG. 6A illustrates a front perspective exploded view of a portion of an electronic display in which liquid-crystal is utilized, according to an embodiment of the present disclosure.

The electronic display 12 may include one or more pixels (represented in FIG. 6A as reference number 22 and in FIG. 6B as reference number 24). If multiple pixels are utilized, an array of pixels may be provided. In other embodiments, a single pixel (or 1×1 pixel arrangement) may be utilized. The electronic display 12 may utilize liquid-crystals contained in the electronic display 12 to perform the filtering of the image. The electronic display 12 may also utilize organic light-emitting diodes contained in the electronic display 12 for filtering the image. In other embodiments, other forms of electronic filtering may be utilized. For example, electronic displays as disclosed herein may make use of quantum dots and the like. It is to be understood that all forms of electronic technology that is capable of being adjusted for purposes of filtering an image for use with a camera is within the scope of electronic displays as disclosed herein.

The electronic display 12 may have a front surface 26, a rear surface (opposite the front surface), and may include one or more side surfaces 28. In FIG. 1, four side surfaces are shown. A housing 14 may be positioned at a side surface of the electronic display 12 and may form a border of the filter 10. In one embodiment, a border may extend around the entirety of the electronic display 12, and may form a frame for the electronic display 12. The housing 14 may comprise a part of the frame, and the frame may extend around all or a portion of the electronic display 12.

The filter 10 may be sized such that the filter may fit in a standard filter slot of a matte box. The filter 10 may be sized for camera use or cinematographic camera uses. The filter 10 may have a rectangular shape. In one embodiment, the filter 10 may be sized to be about 4 inches in the vertical dimension and about 5.65 inches in the horizontal dimension. In one embodiment, the filter 10 may be sized to be about 6 inches in the vertical dimension and about 6 inches in the horizontal dimension. The filter 10 may be sized to be about 4 millimeters thick. In other embodiments, the size of the filter 10 may be varied. In one embodiment, the dimensions of the filter 10 may be configured to be no more than 7 inches in the horizontal or vertical dimension. In one embodiment, the filter 10 may be configured to be no more than 6.5 inches in the horizontal or vertical dimension. In one embodiment, the thickness of the filter 10 may be sized to be no more than 10 millimeters thick. In one embodiment, the electronic display 12 may have a size that is no more than 7 inches in the horizontal or vertical dimension have a size that is no more than 6.5 inches in the horizontal or vertical dimension. In one embodiment, the electronic display 12 may have a size that is no more than 140 millimeters in the horizontal or vertical dimension. The size of the filter 10 and the electronic display 12 is preferably set to account for camera lens sizes, as the filter 10 is preferably used with camera lenses, which sizes are understood to vary depending on the particular type of camera and the camera use application.

In one embodiment, the shape of the filter 10 and the electronic display 12 may be varied from the shape shown in FIG. 1. For example, a round or circular shape, a square shape, or other shapes may be utilized.

The electronic display 12 comprises a portion of the filter 10 for light to pass through. The housing 14 and other electrical components of the filter 10 are preferably positioned outside of the viewing aperture of the filter 10, such that the housing 14 and other electrical components do not obscure the view of the image being imaged by the camera lens. In other embodiments, however, the housing 14 and electrical components may be within the viewing aperture. For example, the housing 14 and/or electrical components may be transparent, such that the view of the image is not obscured by their presence.

A controller 16 may be used to electrically control the filtering of the electronic display 12. The controller 16 may be electrically coupled to the electronic display 12. The controller 16 may include a microprocessor of the like for controlling the filtering of the electronic display 12. The controller 16 may electrically control the filtering by varying the properties of the electronic display 12. For example, the controller 16 may cause the amount of light transmitted through the electronic display 12 to vary, or may cause the color of the light to vary, or may cause light to be emitted from the electronic display 12 that varies the image. It is to be understood that the controller will be configured differently as useful for purposes of varying one or more properties of the electronic display depending on the particular type of electronic technology being used. In the embodiment shown in FIG. 1, the controller 16 may be positioned within the housing 14. However, in other embodiments, the controller 16 may be located separate from the electronic display 12. For example, the controller may be part of a lens system, and may plug into the electronic display 12 when the electronic display 12 couples to the lens system. The controller 16 may also be positioned remote from the lens system and may otherwise communicate with and control the electronic display 12. The controller 16 may electrically connect with the electronic display 12 via electrical conduits (not shown). The electrical conduits may be transparent to avoid obscuring the image through the electronic display 12.

A power source 18 may be used to power electrical components of the filter 10. The power source may be positioned within the housing 14, as shown in FIG. 1, or in other embodiments may be positioned remote from the filter 10. For example, the power source 18 may be part of a lens system, and may plug into the filter 10 when the filter 10 couples to the lens system. In other embodiments, the power source 18 may be positioned remote from the lens system. The power source 18 may comprise a battery, capacitor, solar cell, AC or DC source, a plug for receiving external energy, among other forms of power sources. In one embodiment, the power source 18 may comprise an inductive receiver (such as an inductive coil or other form of receiver) for receiving inductive energy from an inductive transmitter (such as an inductive coil or other form of transmitter). The inductive receiver may be positioned proximate the inductive transmitter and may receive energy wirelessly for powering the filter 10 or charging a battery or other power storage device of the filter 10. In one embodiment, the power source 18 may be positioned within the viewing aperture of the electronic display 12, for example in an embodiment in which the power source 18 is transparent.

An input 20 may be for receiving a control for controlling the controller 16. The input 20 may be positioned within the housing 14, as shown in FIG. 1, or may be remote from the housing 14 in a similar manner as the controller 16 or power source 18. For example, the input 20 may be part of a lens system, and may plug into the filter 10 when the filter 10 couples to the lens system. In other embodiments, the input 20 may be positioned remote from the lens system. The input 20 may comprise a wireless signal receiver. The input 20 may operate to receive wireless signals via Wi-Fi, Bluetooth, peer-to-peer connection, cellular connection, radio connection, or other forms of wireless signal communication. In one embodiment, the input 20 may comprise a wired connection that physically connects to receive a control. For example, the wired connection may allow the operator of the camera system to control the electronic display 12. The wired connection may comprise a plug or other wired connection that receives a control. In one embodiment, the input 20 may comprise a manual input (such as a knob, button, slider, or other form of input) that allows a user to provide a control. Other forms of inputs 20 may also be utilized. The control that the input 20 receives may have a variety of forms, and may comprise a control signal, a manual input, or other form of control. The control may be provided wirelessly (or with a wired connection). The control may comprise a command for controlling the controller 16.

The input 20 may connect with a control terminal 30. The control terminal 30 may comprise a remote terminal that may wirelessly communicate with the input 20. The control terminal 30 may be configured to transmit a control to the input 20, and may also receive information from the input 20 regarding the status of the filter 10. In this manner, the input 20 may comprise a transmitter as well as a receiver. In one embodiment, the control terminal 30 may communicate with the input 20 via a wired connection. The control terminal 30 may comprise a computer, tablet, a smart phone, or may comprise another form of terminal device. The control terminal 30 may comprise a dedicated controller for the filter 10. The control terminal 30 for example, may be part of the lens system or camera system that the filter 10 is utilized with.

Figure 4:
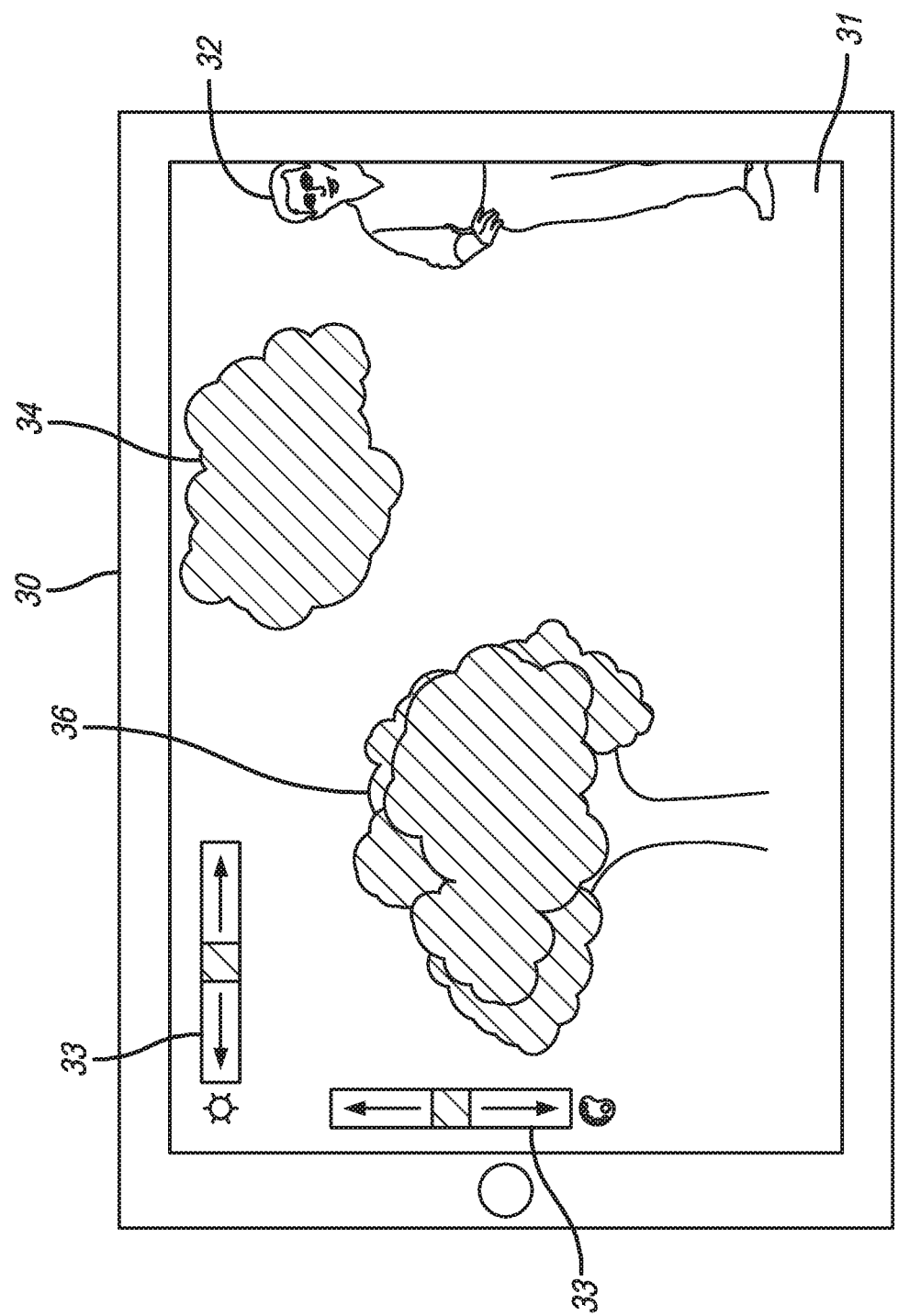
FIG. 4 illustrates a front view of a control interface of a control terminal according to an embodiment of the present disclosure.

The control terminal 30 may be utilized to set or control the filtering of the electronic display 12. The control terminal 30 may have a control interface, which may be utilized by a user to set or control the filtering of the electronic display 12. For example, the control interface may be part of a software application (or "app") that is used to set or control the filtering of the electronic display 12. The control interface may also display information received regarding the status of the filter 10. FIG. 4, for example, illustrates the control terminal 30 in the form of a tablet. A display 31 may display the image received by the camera. The control terminal 30 may utilize a control interface in the form of a touch screen. The control interface may include interface controls 33 such as touch sliders that can vary the color, brightness, or other forms of filtering of the filter 10. In one embodiment, the user may touch certain parts of the control interface to indicate the location of the image where filtering should occur. For example, the user may encircle or otherwise touch the cloud 34 to select that the filtering for only the cloud should be varied. The user may select the entire image or a portion of the image for filtering, or different types of filtering, to occur. Other forms of control interfaces and interface controls 33 may be utilized.

In other embodiments, other forms of software may be used to set or control the filtering of the electronic display 12. Other control interfaces may be utilized. For example, a standard keypad or series of buttons or knobs may be utilized as a control interface. The user may set a desired property of the filtering of the electronic display, or may select a sequence of varied filtering for the electronic display 12 to follow, along with other forms of controls.

Figure 5B:
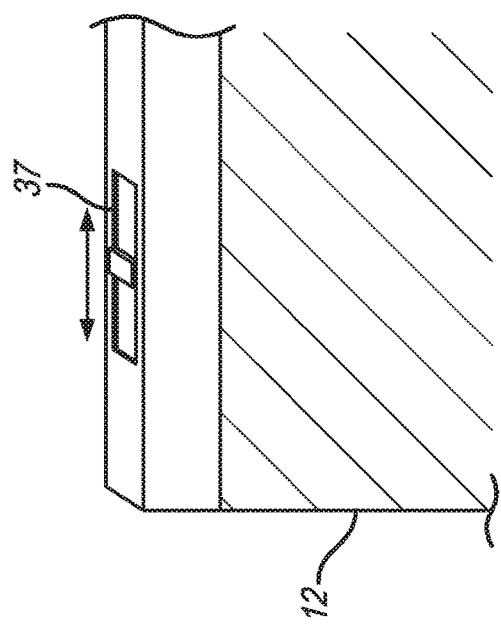
FIGS. 5A, 5B, and 5C each illustrate close-up views of inputs according to embodiments of the present disclosure.
Figure 5C:
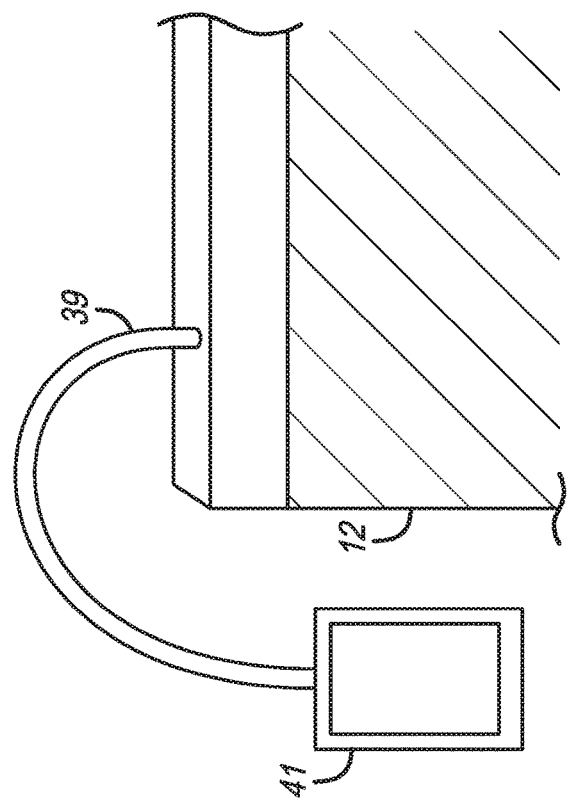
Figure 5A:
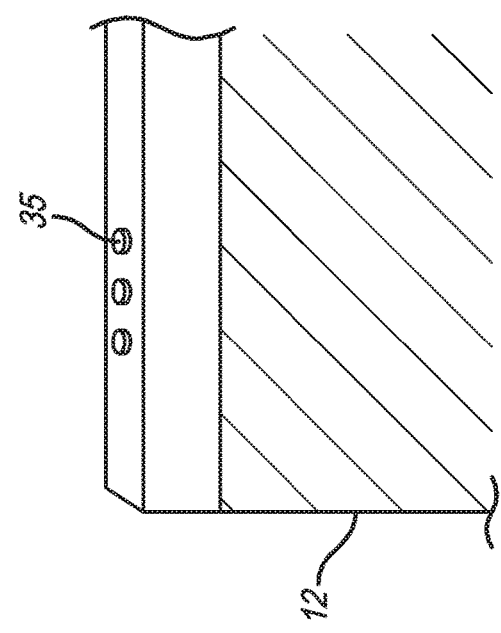

FIGS. 5A-5C illustrate other forms of inputs that may be utilized with the filters disclosed herein. In FIG. 5A, an input 35 in the form of buttons may be provided on the body of the filter. The user may press the buttons to allow the input 35 to receive a control for controlling the controller. In FIG. 5B, an input 37 in the form of a slider may be provided on the body of the filter. The user may slide the slider to allow the input 37 to receive a control for controlling the controller. In FIG. 5C, an input in the form of a cord 39 coupled to a control terminal 41 may be coupled to the filter. The user may input controls via the control terminal 41 for controlling the controller and operation of the filter.

In one embodiment, the filter may be operated by being coupled to the lens controls of the camera system. For example, an input may be configured such that the filtering of the filter varies according to a variation in the iris or focus of the camera, or other optical feature of the camera. This may occur through a corded connection or other form of connection (e.g., wireless) with the lens controls of the camera system.

In one embodiment, the filter may be operated autonomously based on the image received or provided to the camera. A sensor may be utilized to detect the image provided to the camera, and a control may be provided to the filter input to vary the filtering automatically based on the received image. For example, if a scene is bright, the filter may be configured to automatically decrease the brightness of the image. The sensor may be located with the camera or may be located elsewhere. In one embodiment, the camera may be configured to provide a control to the input of the filter based on the image received by the camera. For example, if the camera (such as a digital image sensor of the camera) detects it is viewing a bright scene it may provide a control to the input of the filter to reduce the brightness. The filter accordingly may operate in a feedback loop based on the image.

The electronic display 12, the controller 16, the power source 18, and/or the input 20 may comprise a unit that is removably coupled to a lens system. The unit may comprise the electronic display 12 and housing 14 coupled together as shown in FIG. 1. The unit may be sized such that it has a similar size and shape as current non-electronic filters and accordingly may be swapped out for these non-electronic filters and used with similar matte boxes or other methods of coupling filters to lenses. In one embodiment, the filter 10 and its components may be integral with a lens system, and may not be removable. In other embodiments, certain components may be separable from the lens system and certain may be integral with the lens system. In other embodiments, certain components disclosed herein may be excluded entirely.

The electronic display 12 may filter the image to a desired amount or in a certain manner. In the embodiment shown in FIG. 1, the electronic display 12 is filtering the entirety of the image that is viewed through the electronic display 12. The image includes a person 32, a cloud 34, and a tree 36. The entirety of the tree 36, the entirety of the cloud 34 and a portion of the person 32 are filtered (the filtering is represented with diagonal lines in FIG. 1). The filtering may occur by reducing the amount of light from the image that is transmitted through the electronic display 12, or varying the color of the light that is passed through the electronic display 12 from the image, or otherwise varying the characteristics of the light passing therethrough (e.g., by diffusing the image, or by providing a flare). The filtering may also include by emitting light from the electronic display 12 that is overlaid upon the image on the object side of the electronic display 12. The emitted light may vary the color or amount (intensity) of light that is received by the camera lens.

In an embodiment in which the light from the image that is transmitted through the electronic display 12 is reduced, the reduction in light may have various forms. For example, the reduction in light may be similar to a neutral density filter (ND filter), which may filter for all colors of the image substantially equally. The amount of filtering, however, may be varied electronically, thus allowing the electronic display to serve as an electronic variable neutral density filter. In an example, the reduction in light may be caused by liquid-crystals in the electronic display 12 not passing a desired amount of light through the electronic display 12. The light transmittance by the liquid-crystals can be varied electrically. The light transmittance may range from about 50% (similar to an 0.3 ND filter), to about 25% (similar to a 0.6 ND filter), to about 12.5% (similar to a 0.9 ND filter), to about 6.25% (similar to a 1.2 ND filter), to about 3.125% (similar to a 1.5 ND filter), to about 1.5625% (similar to a 1.8 ND filter), to about 0.78125% (similar to a 2.1 ND filter), and all transmittances above, below, and in between. In addition, in an embodiment in which a color filter is used with the electronic display 12, the color of the light passing through individual pixels of the electronic display 12 may be varied. The light transmittance (or density of the filtering) may be varied to any amount, electronically, as desired (e.g., 99%, 65%, etc.). The color of light passing through the electronic display 12 may be varied to any desired colors of the spectrum.

In an embodiment in which organic light emitting diodes (OLED) are utilized, the OLEDs may be set to emit light at a variety of brightness levels, and color levels in an embodiment in which color filtering is utilized. The electronic display 12 may filter the image by adding light from the OLEDs at a certain brightness and color (in an embodiment in which color filtering is utilized) to the light from the image. Light from the image from the may pass through the electronic display and be modified by light added from the OLEDs. The modification may occur throughout the image (as shown in FIG. 1), or may occur on a pixel-by-pixel basis. In one embodiment, the OLEDs may be configured to emit a certain brightness of light, which may be reduced to effectively reduce the brightness of the image.

Figure 2:
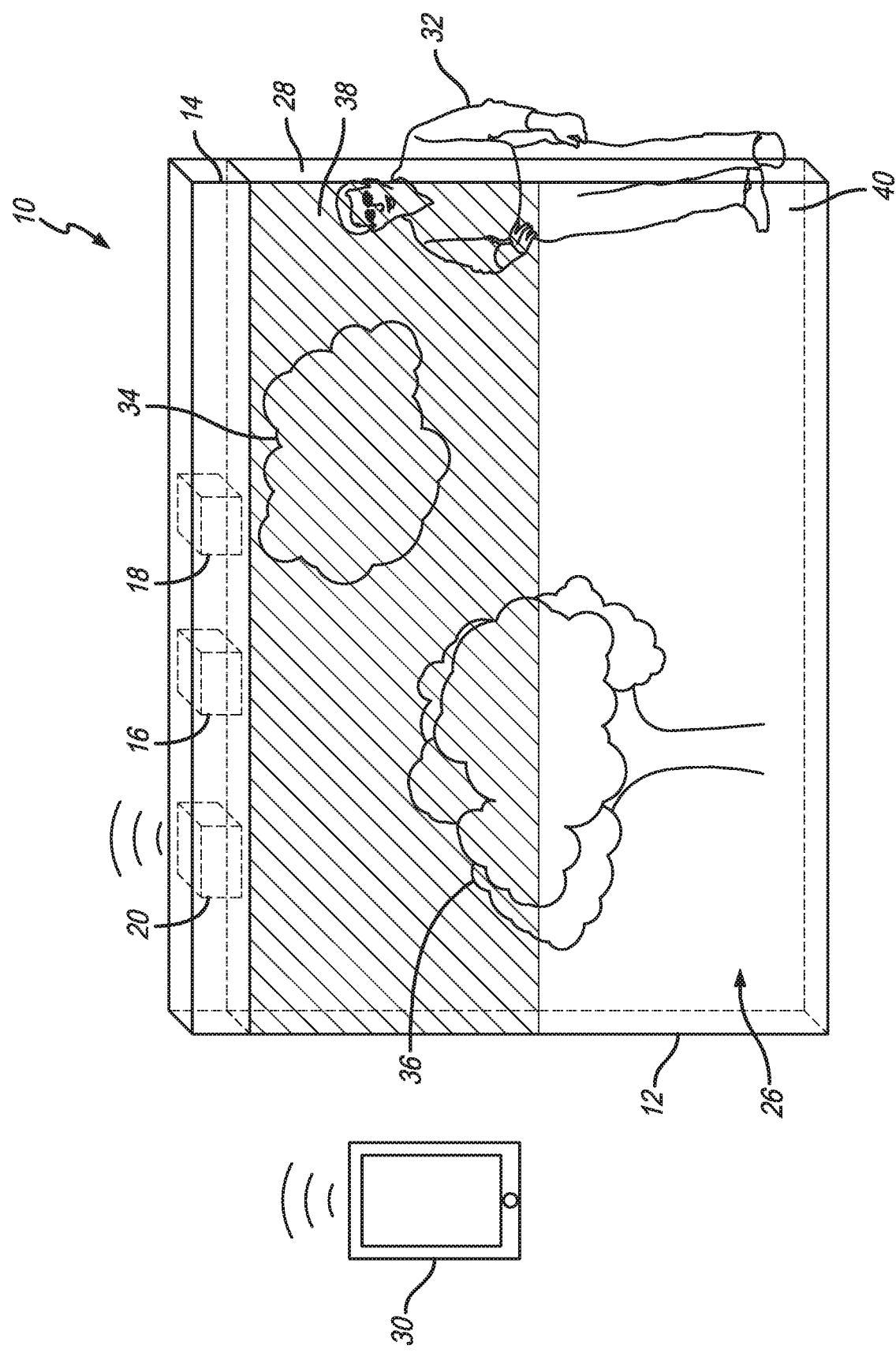
FIG. 2 illustrates a front view of the filter shown in FIG. 1, having different filtering than shown in FIG. 1.

Due to the electronic nature of the electronic display 12, one or more portions of the electronic display 12 may have varied filtering properties. The variation may occur on a pixel-by-pixel basis. FIG. 2, for example, illustrates the electronic display 12 having a portion 38 of the electronic display 12 with a filtered image, whereas another portion 40 of the display does not have a filtered image. The electronic display 12 accordingly operates as a graduated filter. The transition between the filtered portion and the non-filtered portion may be abrupt or may be smooth as desired.

Figure 3:
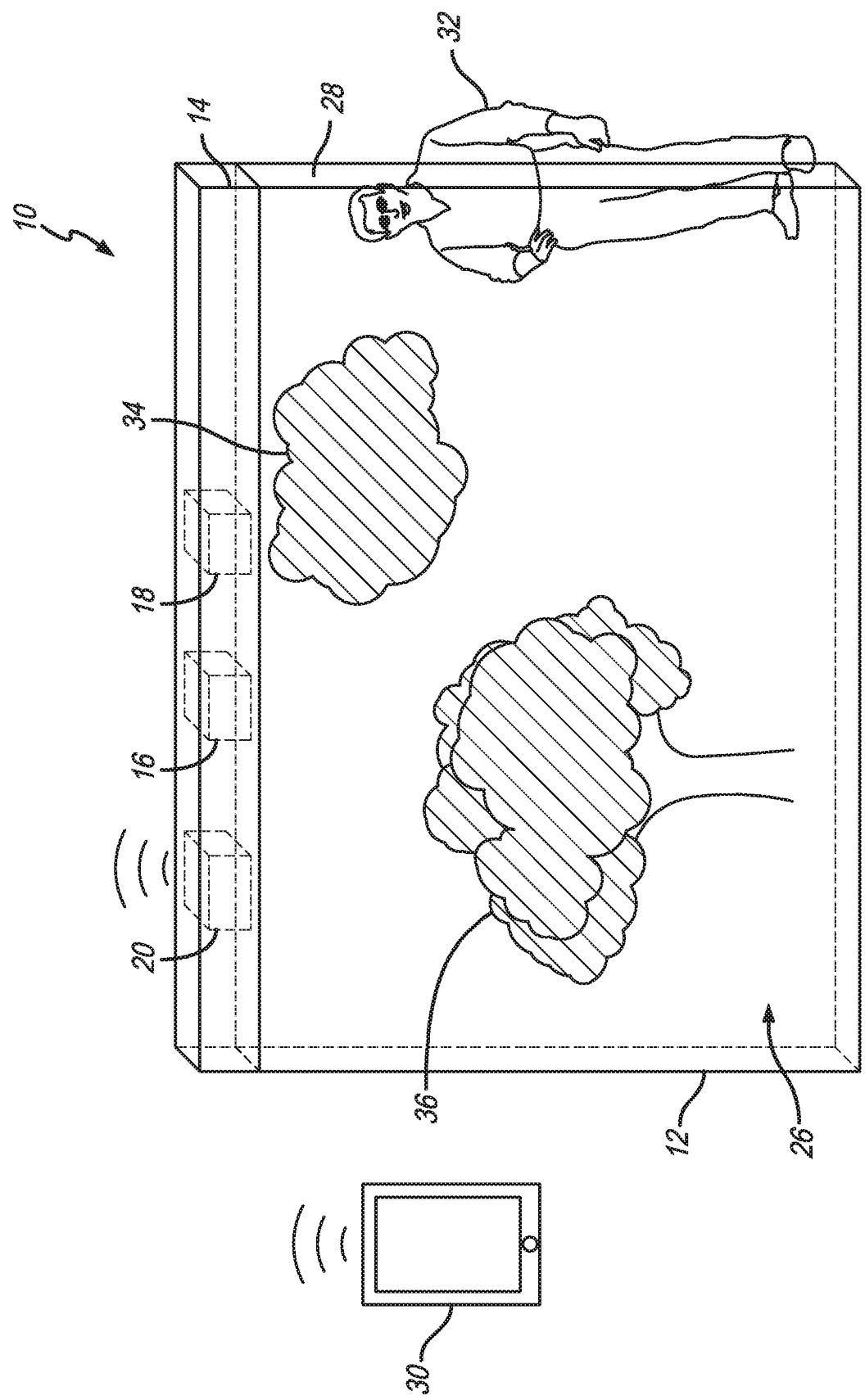
FIG. 3 illustrates a front view of the filter shown in FIG. 1, having different filtering than shown in FIG. 1.

FIG. 3 illustrates the electronic display 12 having selected portions filtered. In the example of FIG. 3, the top of the tree 36 and the cloud 34 are filtered, yet other portions are not filtered. A form of a "burn and dodge" effect may result.

The type and location of the filtering of the electronic display 12 may occur on a pixel-by-pixel basis. As shown in FIGS. 1-3, a variety of types and locations of filtering may be provided as desired. The variation in the filtering may occur based on a control provided to the input of the filter. The control may take a variety of forms, as disclosed herein.

The variation in the filtering of the electronic display 12 may occur dynamically. The type and location of the filtering may vary dynamically. A user, for example, could electronically control the electronic display 12 to rapidly shift the filtering of individual pixels such that a variety of filtering patterns result (e.g., dynamically shift from the filtering pattern shown in FIG. 1, to the pattern shown in FIG. 2, to the pattern shown in FIG. 3). A user may set any feature of the filtering via a control, which may be received from the control terminal 30 or the like. The filtering may be set on a pixel-by-pixel basis. For example, with the control interface shown in FIG. 4, the user could select individual pixels to have a desired filtering property.

The filtering may vary smoothly through density ranges. The filtering may be used to form a custom filter pattern. The filtering may be used in combination with a camera control. For example, an iris of the camera may vary, as well as the filtering, to bring a background object in or out of focus while a foreground object remains in focus (a form of iris filtering).

A benefit of the electronic display 12 is that typically non-electrical filters are used in camera systems and need to be manually swapped out of the camera systems. In addition, filters may not be swapped out during a shot. Further, if a camera is located on a crane that is elevated, the crane would need to be lowered for an individual to manually swap out the filter. The electronic display 12 allows for a variable filter that can be modified remotely. The filter can be varied dynamically, during a shot. A user need not physically touch the camera.

FIG. 6A illustrates an embodiment of a portion of the electronic display 12 in which liquid-crystal is utilized. The portion of the display 12 may include a front panel 42, and a rear panel 44, which may correspond to respective front and rear surfaces of the display 12. The panels 42, 44 may be made of optical glass. The display 12 may include polarized filter panels 46, 48 that are oriented orthogonal to each other. A control layer 50, which may comprise transistors and electrodes, may be utilized. Liquid-crystals 52 are utilized and may be divided into an array of pixels 22. In an embodiment in which color filtering is desired, a color filter 54 may be used. The color filter 54 may include red, green, and blue subpixels that combine to form a colored pixel. The light passing through the colored subpixels determines the color of the light passing through the electronic display 12. In accordance with principles of liquid-crystal display (LCD) technology, the voltage to the liquid crystals 52 may be varied to vary the orientation of the crystals. Varied amounts of light may be transmitted by the liquid crystals 52 based on the voltage to the crystals. In the electronic display 12, however, unlike standard LCD technology, there is no backlight. The image itself produces the light passed through the electronic display 12. In other embodiments, the electronic display 12 using the liquid crystals may have a different usage and structure than shown. For example, in one embodiment, a single pixel may be utilized (a 1×1 arrangement), and it may be utilized to vary the brightness of the image to a desired amount. In one embodiment, the order or presence of the internal layers 50, 52, 54 may vary depending on the desired structure of the electronic display 12. In one embodiment, the presence or structure of the polarized filter panels 46, 48 may be varied as desired.

FIG. 6B illustrates an embodiment of a portion of the electronic display 12 in which OLEDs are utilized. The portion of the display 12 may include a front panel 56, and a rear panel 58, which may correspond to respective front and rear surfaces of the display 12. The panels 56, 58 may be made of optical glass. The display 12 may include a cathode 60 and an anode 62. Electrical controls 64 may be provided in the form of a transistor matrix. Organic layers 66 may be provided that are divided into an array of pixels 24. In an embodiment in which color filtering is provided, the pixels 24 may be arranged into sub-pixels of an emitted color. As shown in FIG. 6B, three pixels 24 are shown, which may be a red, green, and blue pixel. The pixels 24 may be arranged into sub-pixels of an emitted color (such as a purple or orange emitted color). In other embodiments, color may not be provided by the OLEDs. The OLED panel may be transparent, and may allow light from the image to pass therethrough, that is modified by the light from the OLEDs. The configuration of the OLEDs may vary from the configuration shown in FIG. 6B. In one embodiment, the configuration may be an active matrix (AMOLED), or in other embodiments, may be passive (PMOLED). In one embodiment, a single OLED pixel (a 1×1 arrangement) may be provided.

The panels shown in FIGS. 6A to 6D may have a hard anti-reflective coating. The Ravg may be less than 0.2% @400-700 nm, with an angle of incidence at 15 degrees. The transmitted wavefront error may be preferably less than ½λ.

Figure 6D:
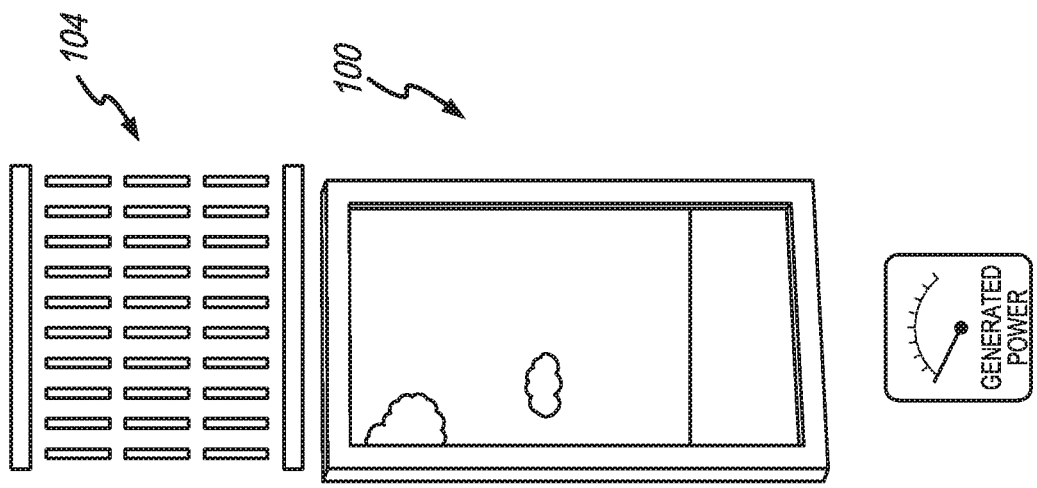
FIG. 6D illustrates the electronic display of FIG. 6C in which liquid-crystal is utilized, according to an embodiment of the present disclosure, wherein the liquid crystal is in a second state of operation.
Figure 6C:
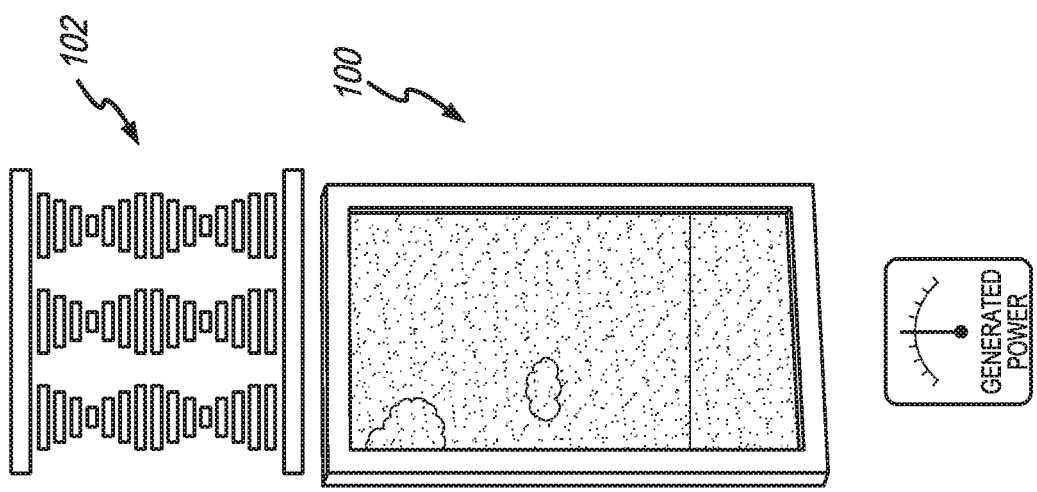
FIG. 6C illustrates a front view of an electronic display in which liquid-crystal is utilized, according to an embodiment of the present disclosure, wherein the liquid crystal is in one state of operation.

While the embodiment illustrated in FIG. 6A for use of liquid crystal shows a certain type of liquid crystal display architecture, it is to be understood that electronic devices utilizing liquid crystal for purposes of electronic displays as disclosed herein may have other types of architectures, wherein all such different architecture are within the scope of this disclosure. With reference to FIGS. 6C to 6E, an embodiment of an electronic display 100 in which liquid-crystal is utilized is illustrated having an architecture different from that illustrated in FIG. 6A. In this example, the liquid-crystal is provided in a guest-host liquid crystal architecture, comprising a liquid crystal cell filled with two materials; namely a dye material or "guest", and a liquid crystal material or "host. In an example, both the guest and host materials are shaped like rods inside of the cell. The transmission state of such electronic display can be controlled by different orientations of the liquid crystal layer.

The transmission of light through the electronic display is controlled by the liquid crystal guest-host dye layer. By applying different voltages over this layer, the orientation of the directors of the liquid crystal can be changed into different states. As the chemical structure of the dye molecules is similar to the liquid crystal molecules, the dye molecules will align themselves with the Liquid crystal directors. FIGS. 6C to 6D illustrate the electronic display 100 and provides a schematic representation of the director structure for two representative states. When unpolarized light is incident on the dye material, a polarization dependent absorption occurs. Introducing a twist in the liquid crystal guest-host dye layer, the orientation of the dyes will be different through the liquid crystal layer so the absorption becomes more polarization independent.

FIG. 6C illustrates the electronic display 100 in a first state where the liquid crystals directors are aligned 102 to reduce the transmission of light therethrough. FIG. 6D illustrates the electronic display 100 in a second state where the liquid crystal directors are aligned 104 to increase the transmission of light therethrough. The changes in the alignment of the liquid crystal directors are changed based on the electrical field that is applied to the electronic display.

In other embodiments, other forms of electronic displays may be used.

Figure 7A:
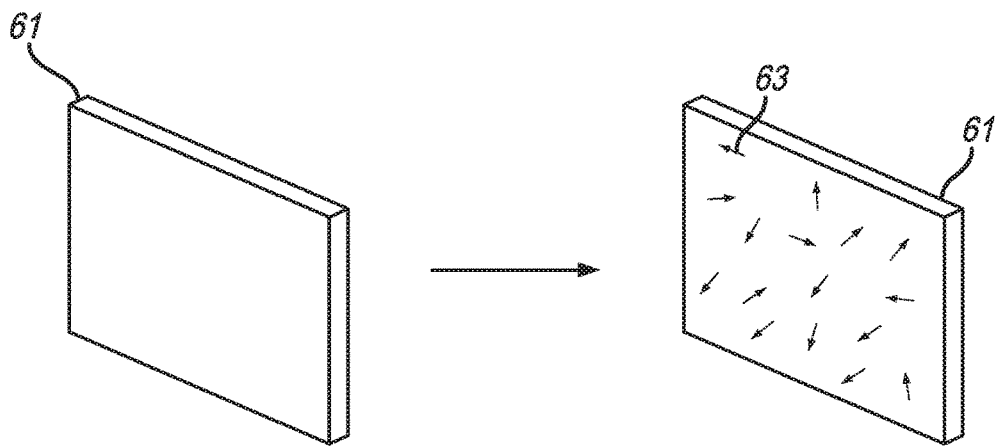
FIG. 7A illustrates a front perspective view of an electronic display performing filtering according to an embodiment of the present disclosure.

FIG. 7A illustrates an embodiment of an electronic panel 61 in which liquid-crystals 63 are utilized to filter the image by diffusing light. The liquid-crystals may be configured to randomly orient themselves upon a voltage or other form of energy being applied or removed from the liquid-crystals. Upon the orientation of the liquid-crystals being varied, a scattering of the light producing a diffusion of the light may result. The degree of diffusion may be varied by varying the amount of voltage or other form of energy being applied or removed from the liquid-crystals. The rightmost image of FIG. 7A illustrates the random orientation of the liquid-crystals.

Figure 7B:
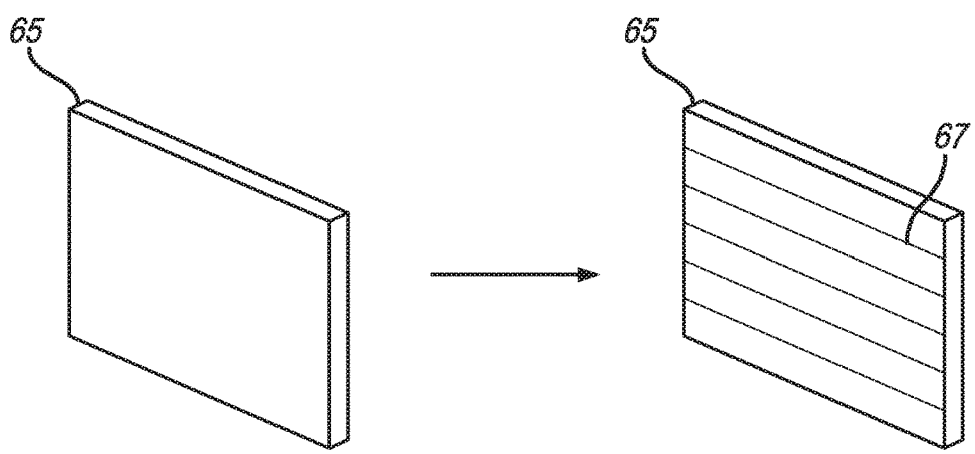
FIG. 7B illustrates a front perspective view of an electronic display performing filtering according to an embodiment of the present disclosure.

FIG. 7B illustrates an embodiment of an electronic panel 65 in which liquid-crystals 67 or particles (such as fiberglass shards) are utilized to filter the image by flaring the light. The liquid-crystals or other particles may be configured to orient themselves in a direction upon a voltage or other form of energy being applied or removed. For example, the liquid-crystals or other particles may be configured to orient themselves in a horizontal direction. Upon the orientation of the liquid crystals or particles being aligned horizontally, a horizontal flaring of the light passing through the panel 65 may occur, similar to the operation of a "streak" filter. In other embodiments, other directions of alignment and of flaring may be provided. For example, vertical flaring, or diagonal flaring may be provided, also similar to the operation of a "streak" filter. In one embodiment, the liquid-crystals or other particles may be configured to orient themselves radially, such that a radial flaring results. The degree of flaring may be varied by varying the amount of voltage or other form of energy being applied or removed from the liquid-crystals or particles, which will accordingly vary the orientation of the liquid-crystals or particles. The rightmost image of FIG. 7B illustrates a horizontal orientation of the liquid-crystals or particles, resulting in a horizontal flaring of the light (although other orientations may also be provided).

Figure 7C:
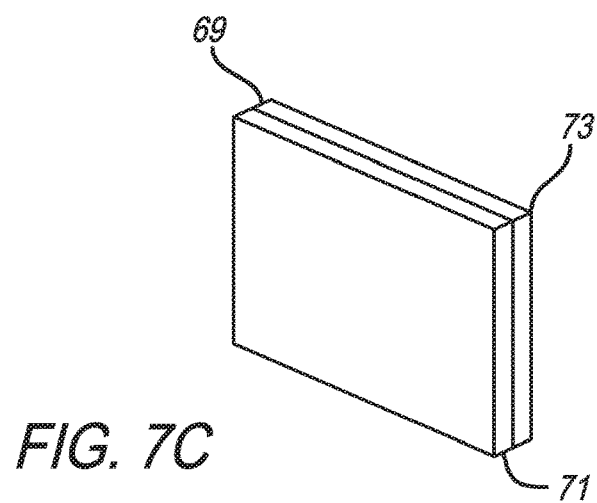
FIG. 7C illustrates a front perspective view of a panel of liquid-crystals utilized in combination with a panel of one or more organic light emitting diodes, according to an embodiment of the present disclosure.

In one embodiment, a combination of liquid crystals and OLEDs may be utilized. FIG. 7C illustrates a configuration of an electronic panel 69 in which an electronic panel 71 including one or more OLEDs is utilized in combination with an electronic panel 73 including liquid crystals. The panels 71, 73 may operate according to the methods disclosed herein for respective OLED panels and liquid-crystal panels. The panels 71, 73 may be configured in a stacked orientation in which light passes through both panels 71, 73. The electronic panel 73 accordingly may darken or lighten the image (or produce other optical effects disclosed herein), and the electronic panel 71 may add overlay light upon the resulting image to produce filtering.

The electronic panels disclosed herein may be controlled by the apparatuses, systems, and methods disclosed herein. A combination of panels and panel effects may be provided as desired.

Figure 8:
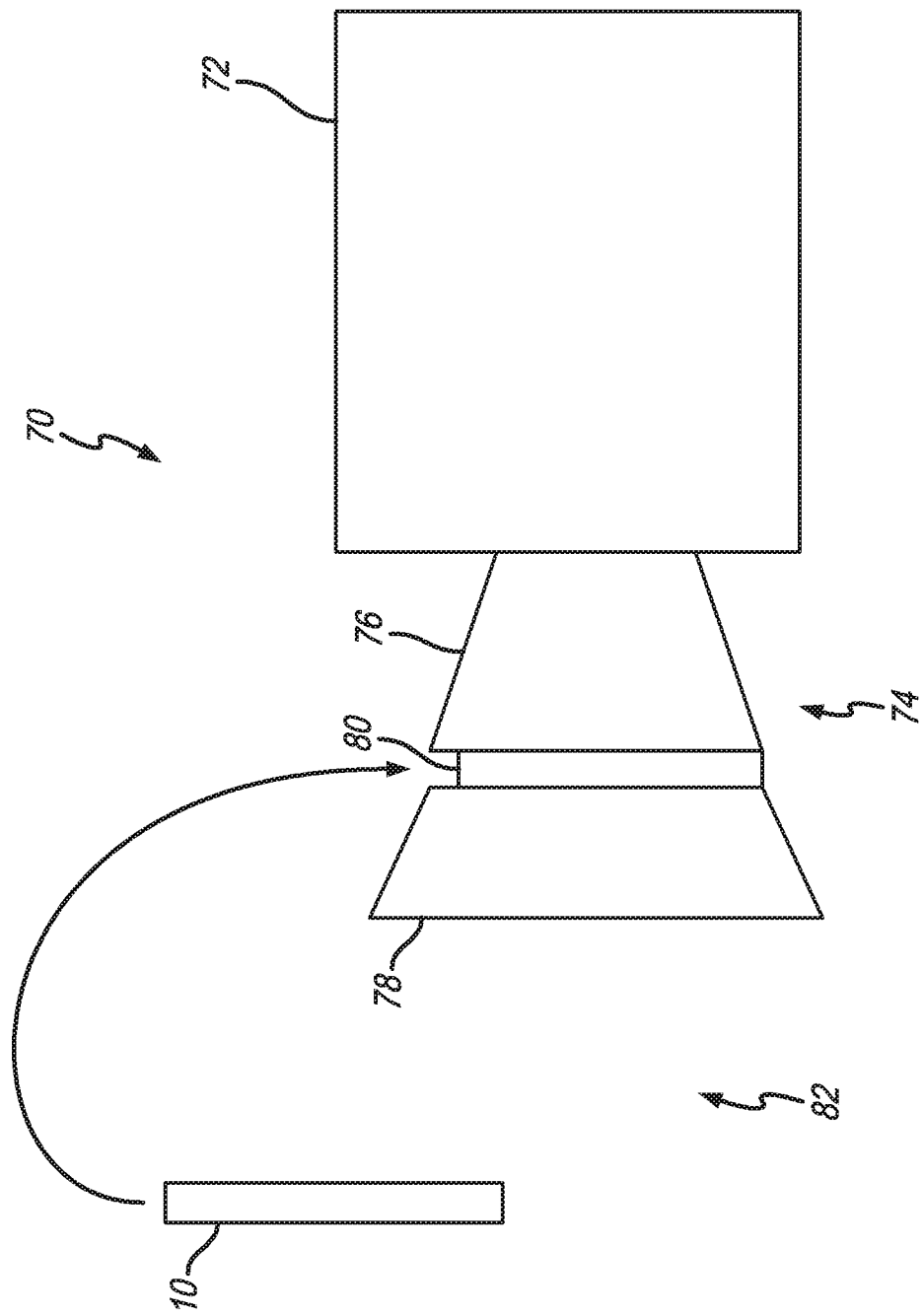
FIG. 8 illustrates a side view representation of a camera system, according to an embodiment of the present disclosure.

FIG. 8 illustrates a side view representation of a camera system 70. The camera system 70 may include a camera 72 and may include a lens system 74. The lens system 74 may include a camera lens 76 and may include a matte box 78. The matte box 78 may include a filter slot 80 for receiving the filter 10. The filter 10 may be positioned on the object side 82 of the camera lens 76 (as opposed to the image side, upon which the camera receives the image). The camera lens 76 may comprise one or more individual lens elements.

The filter 10 may be removably coupled to the matte box 78. The matte box 78 may be a conventional mattebox for cinematographic cameras.

In other embodiments, other forms of coupling of the filter 10 to the lens system 74 or the camera system 70 may be utilized. For example, a screw-on, snap-on, or other form of mechanical connection may be provided for coupling.

Figure 9:
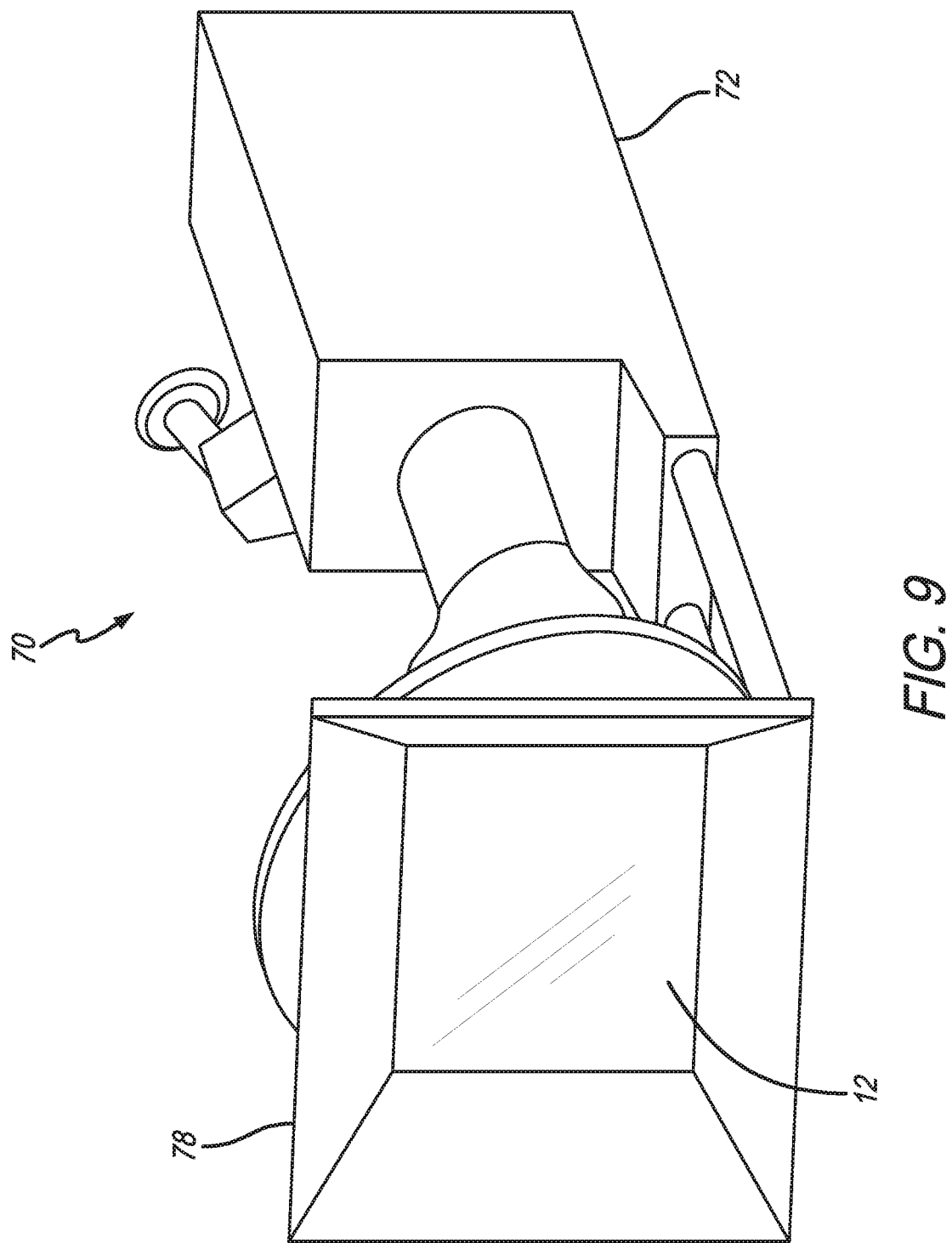
FIG. 9 illustrates a front perspective view of a camera system, according to an embodiment of the present disclosure.

FIG. 9 illustrates a front perspective view of the camera system 70. The filter 10 is installed in the matte box 78.

Figure 10:
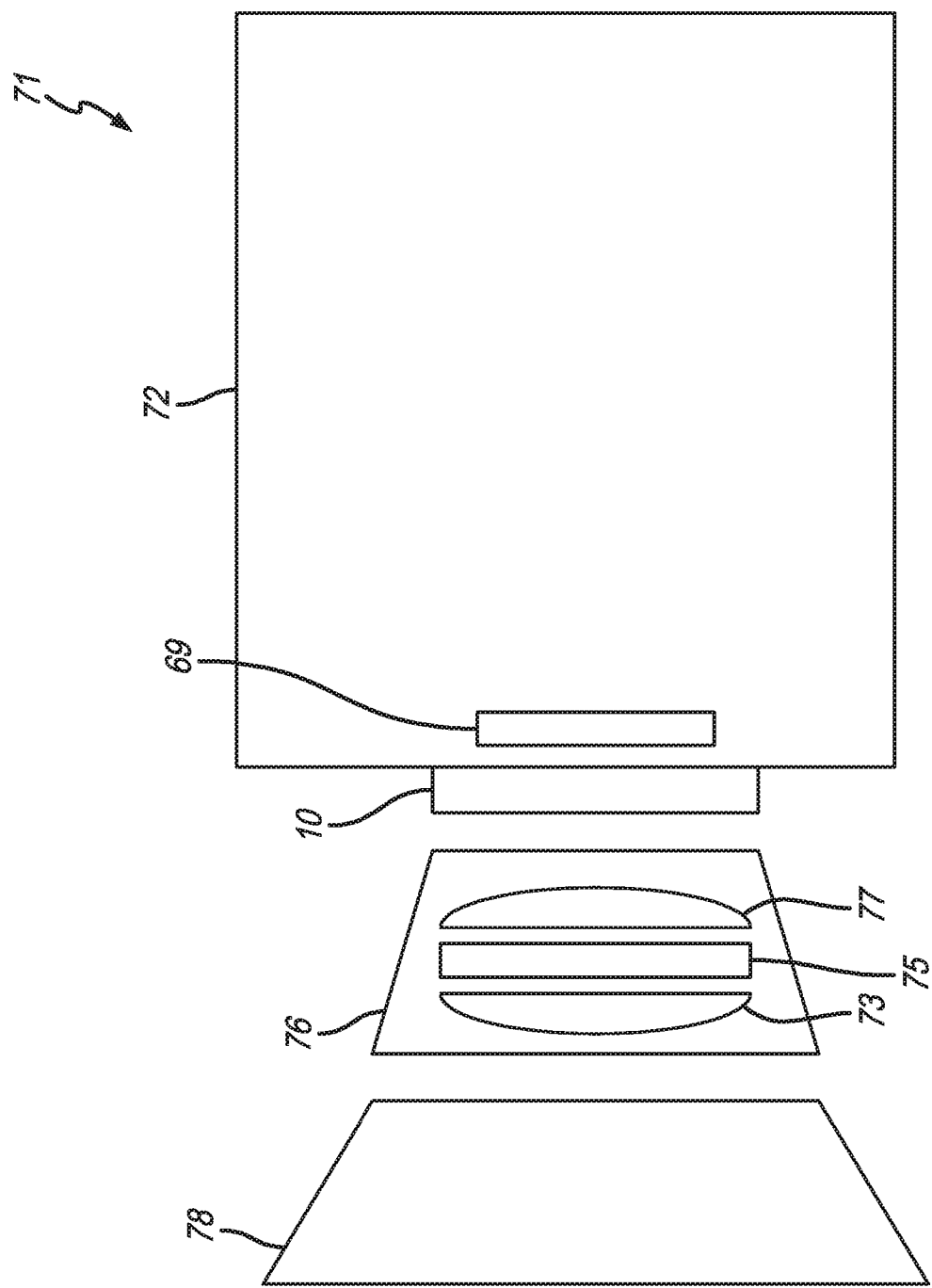
FIG. 10 illustrates a side view representation of a camera system, according to an embodiment of the present disclosure.

FIG. 10 illustrates an embodiment in which the filter is positioned between the camera lens 76 and the image receiver 69 of the camera 72. The image receiver 69 may comprise a digital sensor or film for receiving the camera image, or other forms of image receivers. The filter 10 may be configured to provide the filtering disclosed herein, yet on the image side of the camera lens 76 and the object side of the image receiver 69. A plurality of lens elements 73, 75, 77 are shown to comprise the lens 76. The filter 10 is positioned within the optical path of the camera system 71. In certain embodiments, the filter 10 may preferably include OLEDs for providing the OLED filtering disclosed herein. The filter 10 may be removably, or permanently coupled to the camera system 71.

In embodiments herein, the camera 72 may be a camera for moving pictures (a film or digital camera), or may be a static image camera, e.g., a camera used for still photography. The camera may be used for cinematographic use (movie production), or may be used for non-cinematographic or commercial purposes. In one embodiment, the camera may be a mobile device (smart phone or other form of mobile device).

Figure 11:
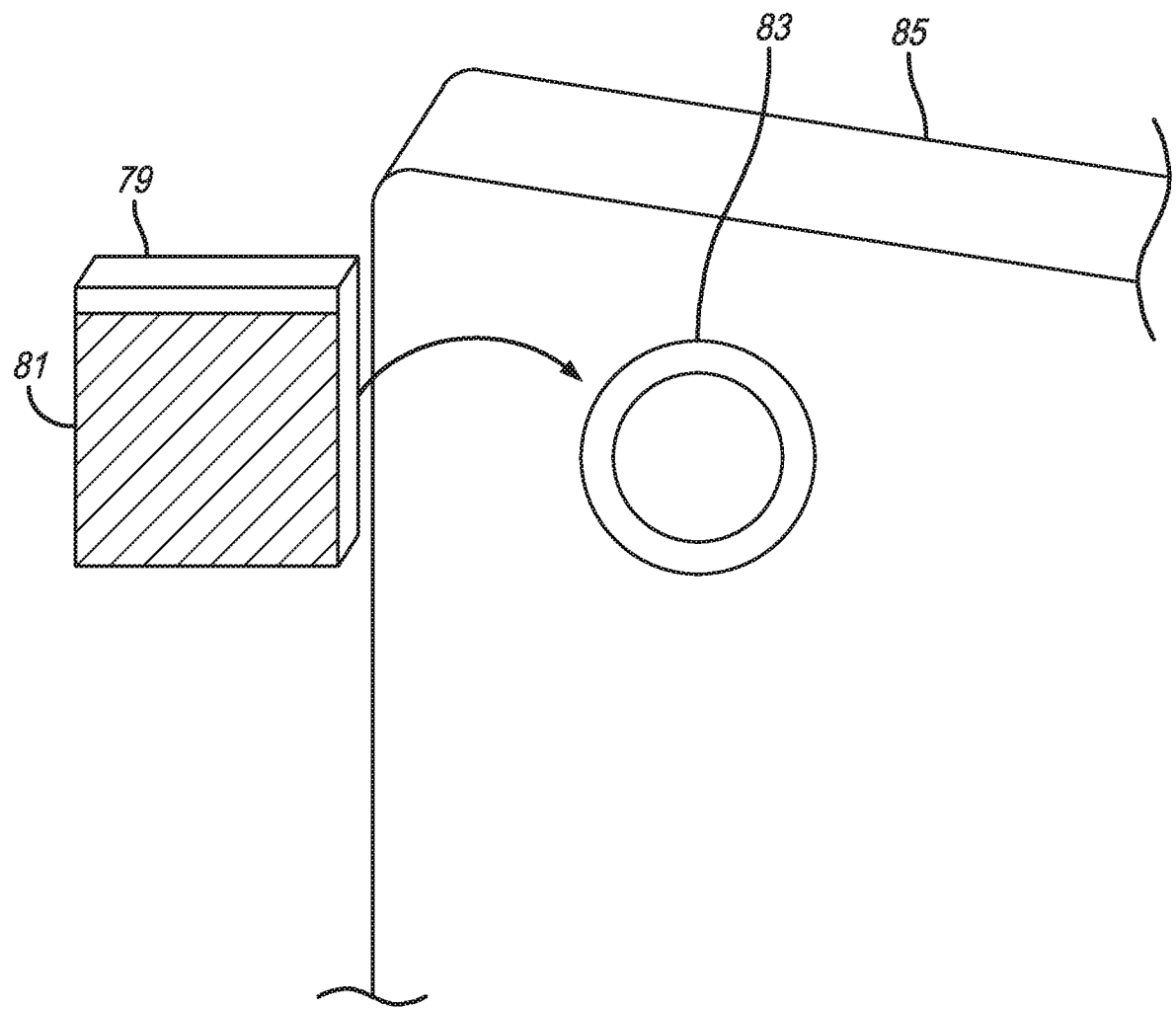
FIG. 11 illustrates a close-up view of an electronic display for use in combination with the camera of a mobile device, according to an embodiment of the present disclosure.

FIG. 11, for example, shows a filter 79 including an electronic display 81 according to embodiments disclosed herein. The filter 79 is to be coupled to the object side of a camera lens 83 of a mobile device's 85 camera. The filtering disclosed herein may be provided. The filter 79 may be removably coupled to the mobile device 85. The removable coupled may occur through an adhesive, a screw or snap fit, or other form of coupling. In one embodiment, the filter 79 may be positioned on the image side of the camera lens 83, and thus may be permanently coupled to the mobile device 85.

In one embodiment, the filters, electronic displays, and other apparatuses, systems, and methods, are not limited to use with a camera. The filters, electronic displays, and other apparatuses, systems, and methods may be used in other optical implementations, such as augmented reality viewers (including headsets, handsets, and the like) and virtual reality viewers (including headsets, handsets, and the like)

The disclosure is not limited to the apparatuses, and systems disclosed herein, but also extends to all methods of using, providing, or performing any of the apparatuses, and systems disclosed herein and their respective features.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, apparatuses, and methods as disclosed herein, which is defined solely by the claims. Accordingly, the systems, apparatuses, and methods are not limited to that precisely as shown and described.

Certain embodiments of systems, apparatuses, and methods are described herein, including the best mode known to the inventors for carrying out the same. Of course, variations on these described embodiments will become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described embodiments in all possible variations thereof is encompassed by the systems, apparatuses, and methods unless otherwise indicated herein or otherwise clearly contradicted by context.

Groupings of alternative embodiments, elements, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses an approximation that may vary, yet is capable of performing the desired operation or process discussed herein.

The terms "a," "an," "the" and similar referents used in the context of describing the systems, apparatuses, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed element essential to the practice of the systems, apparatuses, and methods.

All patents, patent publications, and other publications referenced and identified in the present specification are individually and expressly incorporated herein by reference in their entirety for the purpose of describing and disclosing, for example, the compositions and methodologies described in such publications that might be used in connection with the systems, apparatuses, and methods. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. A filter for a camera lens, the filter comprising:
    an electronic display configured to couple to an object side of the camera lens and configured to filter an image on an object side of the electronic display for the camera lens;
    a controller configured to electrically control the filtering of the electronic display and configured to receive an input from a sensor of the image provided to the camera lens; and
    an input for receiving a control for controlling the controller,
    wherein the controller is configured to receive a selection by a user of a portion of the image to be filtered, and the controller is configured to electrically control the filtering of the electronic display such that the portion of the image selected by the user to be filtered is filtered, and the filtering of the portion of the image selected by the user varies automatically based on the input provided to the controller from the sensor of the image provided to the camera lens, and
    wherein the electronic display is configured to align particles contained within the electronic display to flare light transmitted through the electronic display to function as a streak filter.

2. The filter of claim 1, wherein the particles comprise liquid-crystals for filtering the image.

3. The filter of claim 1, wherein the electronic display includes one or more organic light-emitting diodes therein for filtering the image.

4. The filter of claim 1, further comprising a housing coupled to the electronic display, and wherein the controller and the input for receiving a control for controlling the controller are positioned within the housing.

5. The filter of claim 4, wherein the housing comprises at least a portion of a frame for the electronic display.

6. The filter of claim 1, wherein the electronic display is configured to removably couple to a matte box for coupling to the camera lens.

7. The filter of claim 1, wherein the electronic display includes a front surface, a rear surface, and one or more side surfaces, and the filter further comprises a housing positioned at the one or more side surfaces.

8. The filter of claim 1, wherein the electronic display includes one or more pixels.

9. The filter of claim 1, wherein the electronic display includes an array of pixels.

10. The filter of claim 1, wherein the electronic display is configured to filter the image on the object side of the electronic display by reducing the amount of light transmitted through the electronic display.

11. The filter of claim 1, wherein the electronic display is configured to filter the image on the object side of the electronic display by diffusing light transmitted through the electronic display.

12. The filter of claim 1, wherein the electronic display is configured to filter the image on the object side of the electronic display by emitting light that is overlaid upon the image.

13. The filter of claim 1, wherein the electronic display is configured to filter the image on the object side of the electronic display for all colors of the image substantially equally.

14. The filter of claim 1, wherein the portion of the image selected by the user to be filtered comprises a first portion, and the image includes a second portion, and the controller is configured to electrically control the filtering of the electronic display such that the first portion is filtered at the same time the second portion is not filtered.

15. The filter of claim 14, wherein the controller is configured to electrically control the filtering of the electronic display such that the filtering of the electronic display varies such that the second portion is filtered at the same time the first portion is not filtered.

16. The filter of claim 1, wherein the input for receiving a control for controlling the controller comprises a wireless signal receiver.

17. A filter for a camera system, the filter comprising:
    an electronic display configured to couple to a portion of the camera system in an optical path of a lens of the camera system and configured to filter an image on an object side of the electronic display for the camera system, the electronic display including particles contained within the electronic display and one or more organic light emitting diodes;
    a controller configured to electrically control the filtering of the electronic display; and
    an input for receiving a control for controlling the controller, and
    wherein the electronic display is configured to align the particles contained within the electronic display to flare light transmitted through the electronic display to function as a streak filter.

18. The filter of claim 17, wherein the electronic display is configured to couple to the camera system between the lens of the camera system and an image receiver of the camera system.

19. The filter of claim 17, wherein the electronic display is configured to couple to the camera system at an object side of the lens of the camera system.

20. The filter of claim 17, wherein the electronic display is configured to filter the image on the object side of the electronic display by emitting light that is overlaid upon the image.

21. A camera system comprising:
    a camera including a camera lens;
    an electronic display configured to couple to an object side of the camera lens and configured to filter an image on an object side of the electronic display for the camera lens;
    a sensor configured to detect the image provided to the camera lens;

a controller configured to electrically control the filtering of the electronic display and configured to receive an input from the sensor of the image provided to the camera lens; and
an input for receiving a control for controlling the controller,
wherein the controller is configured to receive a selection by a user of a portion of the image to be filtered, and the controller is configured to electrically control the filtering of the electronic display such that the portion of the image selected by the user to be filtered is filtered, and
wherein the electronic display is configured to align particles contained within the electronic display to flare light transmitted through the electronic display to function as a streak filter.

22. The camera system of claim 21, wherein the camera comprises a film camera or a digital camera.

23. The camera system of claim 21, further comprising a matte box, and wherein the electronic display, the controller, and the input for receiving a control for controlling the controller are coupled together as a unit that is configured to be removably coupled to the matte box.

24. The camera system of claim 21, wherein the electronic display includes one or more pixels.

25. The camera system of claim 21, wherein the electronic display includes liquid-crystals therein for filtering the image or one or more organic light-emitting diodes therein for filtering the image, or a combination thereof.

26. The camera system of claim 21, wherein the input for receiving a control for controlling the controller includes a display that displays the image received by the camera and is configured to receive the selection by the user of the portion of the image to be filtered.

27. The camera system of claim 21, wherein the particles comprise liquid-crystals for filtering the image.

28. A camera system comprising:
a camera including a camera lens;
an electronic display configured to couple to a portion of the camera system in an optical path of the camera lens and configured to filter an image on an object side of the electronic display for the camera system, the electronic display including particles contained within the electronic display and one or more organic light emitting diodes;
a controller configured to electrically control the filtering of the electronic display; and
an input for receiving a control for controlling the controller, and
wherein the electronic display is configured to align the particles contained within the electronic display to flare light transmitted through the electronic display to function as a streak filter.

29. The camera system of claim 28, wherein the electronic display is configured to couple to the camera system between the camera lens and an image receiver of the camera system.

30. The camera system of claim 28, wherein the electronic display is configured to couple to the camera system at an object side of the camera lens.

31. The camera system of claim 28, wherein the electronic display is configured to filter the image on the object side of the electronic display by emitting light that is overlaid upon the image.

32. A method comprising:
providing an electronic display on an object side of a camera lens, the electronic display configured to filter an image on an object side of the electronic display for the camera lens;
providing a controller configured to electrically control the filtering of the electronic display and configured to receive an input from a sensor of the image provided to the camera lens;
providing an input for receiving a control for controlling the controller;
receiving, with the controller, a selection by a user of a portion of the image to be filtered; and
controlling, with the controller, the filtering of the electronic display such that the portion of the image selected by the user to be filtered is filtered, and the filtering of the portion of the image selected by the user varies automatically based on the input provided to the controller from the sensor of the image provided to the camera lens, and
wherein the electronic display is configured to align particles contained within the electronic display to flare light transmitted through the electronic display to function as a streak filter.

33. The method of claim 32, wherein the electronic display includes one or more pixels for filtering the image.

34. The method of claim 32, wherein the electronic display includes liquid-crystals therein for filtering the image or one or more organic light-emitting diodes therein for filtering the image, or a combination thereof.

35. The method of claim 32, further comprising wirelessly transmitting a control to the electronic display to vary the filtering of the electronic display.

36. The method of claim 32, wherein the particles comprise liquid-crystals for filtering the image.

37. The method of claim 36, wherein the electronic display is configured to align the liquid-crystals horizontally to produce a horizontal flaring of the light transmitted through the electronic display or align the liquid-crystals radially to produce a radial flaring of the light transmitted through the electronic display.

38. A method of filtering an image for a camera system comprising:
filtering, with an electronic display positioned in an optical path of a lens of the camera system, the image on the object side of the electronic display for the camera system, the electronic display including particles contained within the electronic display and one or more organic light emitting diodes, and
wherein the electronic display is configured to align the particles contained within the electronic display to flare light transmitted through the electronic display to function as a streak filter.

39. The method of claim 38, further comprising varying the filtering of the electronic display.

40. The method of claim 39, further comprising dynamically varying the filtering of the electronic display.

41. The method of claim 38, wherein the electronic display includes one or more pixels for filtering the image.

42. The method of claim 38, wherein the electronic display is configured to filter the image on the object side of the electronic display by emitting light that is overlaid upon the image.

* * * * *